Aug. 6, 1935.     W. MELAS     2,010,554
MECHANICAL RELAY APPARATUS
Filed Dec. 9, 1931     2 Sheets-Sheet 1
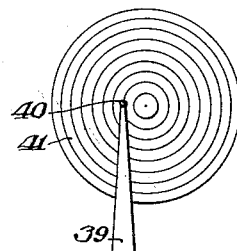
Fig.1.
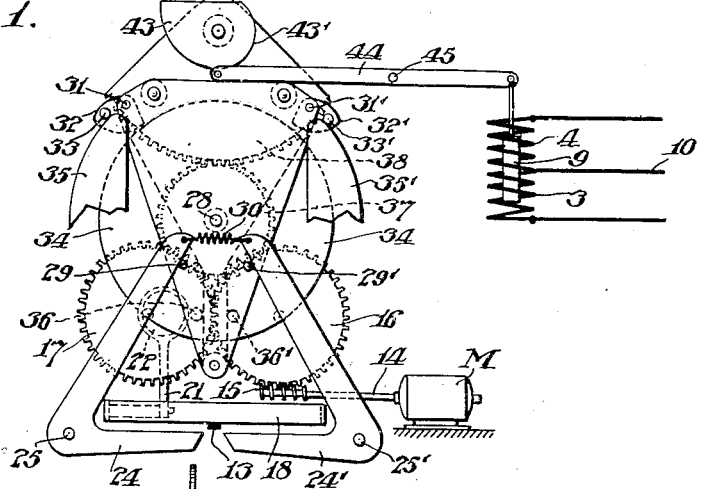
Fig.2.
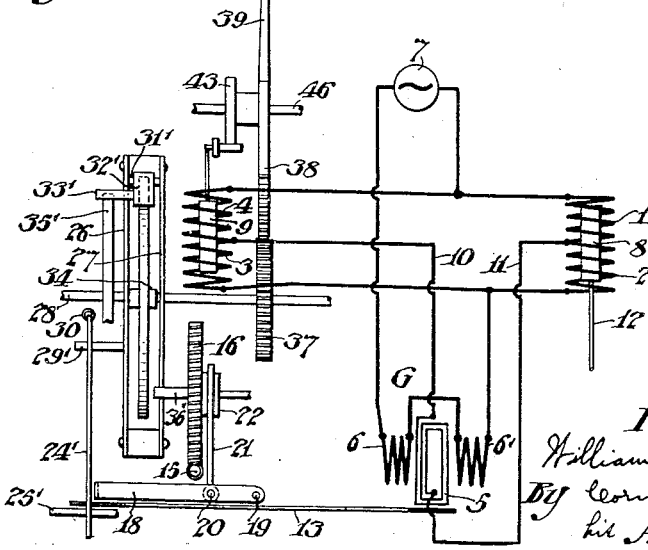
Inventor
William Melas
By Cornelius D. Ehret
his Attorney.

Aug. 6, 1935.  W. MELAS  2,010,554
MECHANICAL RELAY APPARATUS
Filed Dec. 9, 1931  2 Sheets-Sheet 2

Inventor
William Melas
By Cornelius D. Ehret
his Attorney.

Patented Aug. 6, 1935

2,010,554

UNITED STATES PATENT OFFICE 2,010,554

MECHANICAL RELAY APPARATUS

William Melas, Philadelphia, Pa., assignor to Cochrane Corporation, Philadelphia, Pa., a corporation of Pennsylvania Application December 9, 1931, Serial No. 579,944

9 Claims. (Cl. 74—1)

My invention relates to apparatus for indicating, recording, and/or controlling in response to the changes in magnitude of a condition, specifically the rate of flow of a fluid.

In accordance with my invention, in a structure having a driving member normally maintained in a neutral position and a driven member, a pair of elements carried by one of the members effects a driving engagement between them. Normally the elements are restrained from movement to effect the driving engagement, their release depending on the position of a movable means which determines the sense and magnitude of the movement of the driving member from its neutral position. The direction and extent of movement of the driven member is therefore predetermined.

More specifically to provide in mechanical relay structure having a periodically operated member which engages the moving member of a measuring instrument, as a galvanometer, for example, and operating through lever mechanism to periodically deflect rotatable structure in a direction and by an amount corresponding to the deflection of the measuring instrument, the rotatable structure carries two pawls adapted to act in opposite directions to engage a clutch wheel and impart movement of the rotatable structure thereto; fixed members having cam surfaces adapted to engage one or the other of the pawls, dependent upon the direction of rotation of the structure, prevent the pawls from imparting movement to the clutch wheel in the wrong direction; specifically, each of the pawls has a stud or pin secured to and extending therefrom to engage one of the cam members and lift the pawl from the clutch wheel during that movement of the rotatable structure in which the pawl tends to rotate the clutch wheel in the wrong direction.

Further in accordance with the invention, the pawls are eccentrically mounted with respect to the clutch wheel, and have curved surfaces which roll into wedging engagement with the clutch wheel to impart movement thereto in the proper direction during the periodic return of the rotatable structure to its neutral position.

Further in accordance with my invention, motion of the clutch wheel, or equivalent, may be transmitted to a recording element, and/or to a control element; more particularly, it may cause movement of a member of magnetizable material to restore the balance of an electromagnetic system, specifically an inductive bridge network, which includes the galvanometer, or equivalent.

The invention resides in an apparatus, combination and arrangement of the character hereinafter described and claimed.

For an understanding of the invention, and for illustration of some of the forms the apparatus and arrangements may take, reference is had to the accompanying drawings in which:

Fig. 1 is a front elevational view of mechanical relay and recorder structure embodying the principles of the invention;

Fig. 2 is a side elevational view of the relay and recorder structure of Fig. 1, and shows diagrammatically the circuit arrangement of one form of the invention.

Figure 3:
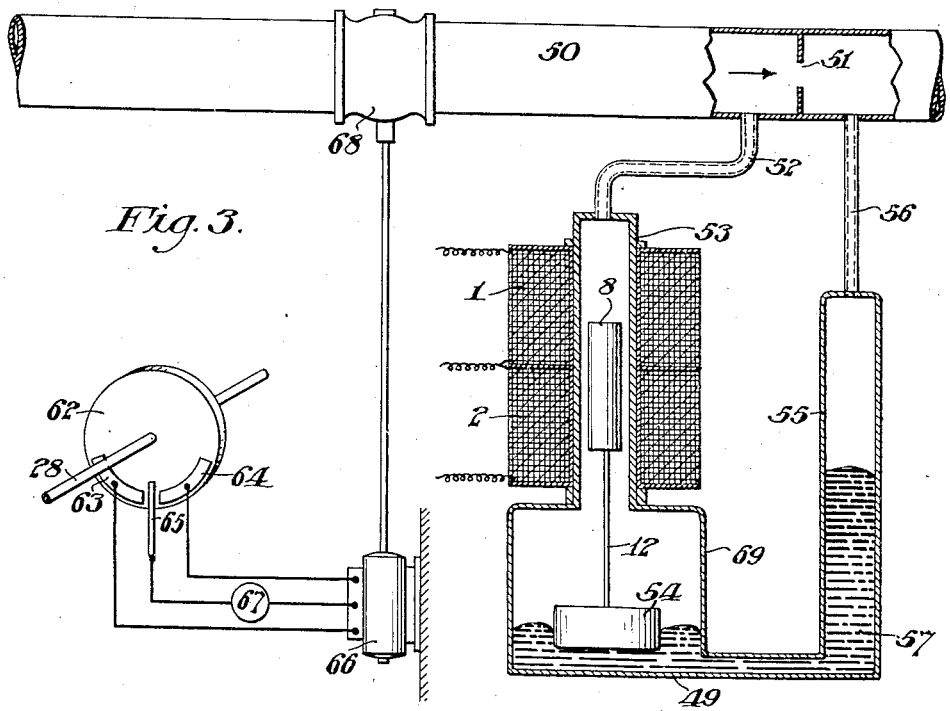
Figs. 3 and 4 are views, parts in section, of a flow meter and recording thermometer, respectively, adapted for use with the arrangement of Fig. 2.

Referring particularly to Figs. 1 and 2, a measuring bridge of the inductance type comprises inductance coils 1, 2, 3 and 4, preferably wound on non-magnetic spools (not shown). One end of each coil is connected, as shown, to the movable coil 5 of an alternating current galvanometer G or other sensitive current detecting instrument. Coils 6 and 6' comprise the field of the galvanometer, and are connected in circuit with inductance coils 1, 2 and 3, 4 and a source 7 of alternating current. Coils 1 and 2 have a movable core or plunger 8 of magnetizable material, the position of the core within the coils determining their relative inductance, and therefore their relative impedance. The coils 3, 4 have a similar core or plunger 9 of magnetizable material, the position of which determines the relative impedance of the coils. The position of plunger 8, relative to the coils 1 and 2, is caused to vary in accordance with the magnitude, or variation in magnitude from a predetermined value, of the quantity or condition to be measured, by a rod 12, preferably of non-magnetizable material, secured to a member movable from its normal position in response to said quantity or magnitude, in the manner illustrated in Figs. 3 and 4.

The inductance coils 1, 2, 3, 4, and the galvanometer G comprise the well-known Wheatstone bridge circuit, supplied with alternating current from the source 7, the relative positions of the cores 8 and 9 determining a balanced or unbalanced condition of the bridge, as the case may be. The relative impedances of the coils 1 and 2 are dependent upon the position of core 8, and if the core 9 is in the same relative position in coils 3 and 4, the bridge is balanced and no current will flow through the galvanometer coil 5, and therefore its pointer or needle 13, is attached to and carried by the movable coil 5, will remain in the mid-position, Fig 1, to which it is normally biased by means of control springs or filaments (not shown) attached to the galvanometer.

When core 8 is moved within coils 1 and 2, their relative inductance is changed and the bridge is electrically unbalanced, so that current will flow through the galvanometer coil 5 and cause it and pointer 13 to deflect to one side or the other of its mid-position, dependent upon the direction of movement or displacement of the core 8, and by an amount proportional to the amount of displacement of the core. The pointer 13 controls mechanical relay mechanism to move the core 9 in a direction and by an amount which will restore the balance of the bridge, in the following manner:

Assume, for example, that core 8 has been displaced upwardly, and has thereby caused the pointer 13 to deflect to the left, as viewed in Fig. 1. A source of power comprising a motor M, which is continuously driven at constant speed, either by direct or alternating current, rotates the shaft 14 carrying worm 15. The worm rotates gear 16 which meshes with a similar gear 17, the gear 16 rotating in a counter-clockwise direction, and gear 17 rotating in a clockwise direction, as viewed in Fig. 1. A U-shaped depressor bar 18 is pivoted on either side at 19, and is alternately raised and depressed, at intervals of a second or two, by means of pivot pin 20, eccentric lever 21, and eccentric 22 attached to the gear 17. In the position shown in Fig. 1, the bar 18 is at that portion of its stroke which permits free swing or lateral movement of the galvanometer pointer 13, and the pointer is therefore free to deflect, as to the left, between the lower surface of bar 18 and the upper surface of left-hand bell crank lever 24. Immediately following the interval in which the galvanometer is allowed to deflect, the bar 18 is depressed, and the pointer 13 is clamped between the bar and the lever 24 at a point which represents the extent of its deflection. The bell crank lever 24 is pivoted at 25, and is adapted to rotate in a clockwise direction about its pivotal point until the bar 18 reaches the bottom of its stroke. In so doing, it will rotate the yoke assembly comprising plates 26 and 27 in a counter-clockwise direction about a shaft 28 by reason of the contact of the bell crank lever with pin 29 secured to and extending from plate 26. It will be seen that, for small deflections, the pointer 13 will engage the bell crank lever at a point far from the pivotal point 25, and for large deflections the lever is engaged at a point near the pivotal point. Therefore, the greater the galvanometer deflection, the greater the deflection of the bell crank lever and yoke assembly. A second bell crank lever 24' is adapted to be actuated in a counter-clockwise direction, when the pointer 13 is deflected to the right, for actuating the relay structure in a corresponding direction. A tension spring 30 serves to keep the bell crank levers in contact with pins 29 and 29', respectively.

The yoke assembly carries at its upper end, by means of pivots 31 and 31', the pawls 32 and 32', respectively, each pawl being eccentrically mounted with respect to a clutch wheel 34 for the purpose hereinafter disclosed. Pins 33 and 33' secured to and extending from the pawls serve to keep one or the other of the pawls out of engagement with the clutch wheel 34, to prevent rotation of the wheel in the wrong direction, by engagement of the pins with the outer edges of fixed members or cams 35 and 35' (shown broken away), the edges comprising arcs having their centers coincident with the axis of rotation 28 of the yoke assembly. Since the yoke assembly has now been moved in a counter-clockwise direction, the pawl 32 is out of engagement with the clutch wheel 34 because its pin 33 rides on the surface of cam member 35 for the duration of this movement, but pawl 32' has been brought into engagement with the clutch wheel 34, although it does not rotate the wheel during counter-clockwise movement because the shape of the pawl and its position with respect to the clutch wheel cause the pawl to rotate counter-clockwise to an extent sufficient to permit its travel over the surface of the wheel.

After rotation to an extent dependent upon the amount of deflection of the pointer 13, the yoke assembly is brought back to its normal or mid-position by a stud or pin 36' carried by and extending from the rotating gear 16, the pin engaging an edge of the plate 27, shown in dotted lines in Fig. 1, which forms the back plate of the yoke assembly. In thus returning to the mid-position, the pawl 32' is rotated in a clockwise direction by its contact with the clutch wheel 34, and due to the eccentric mounting of the pawl, its rounded surface will roll into wedging engagement with the clutch wheel, and therefore the pawl carries with it the clutch wheel which, through shaft 28, rotates gear 37 which engages a sector 38 pivotally mounted at 46. If desired, the clutch wheel may have serrations or teeth, and the pawl adapted to ratchet over the serrations when the pawl is carried in one direction by the yoke assembly, and to engage the serrations during return of the assembly to its normal position.

The sector 38 carries an arm 39, and a marker or stylus pen 40 which bears upon a record or chart 41 rotated by clockwork mechanism 42, thus giving a graphic record of the variation in movement of the core member 8.

The sector 38 also carries cam member 43 co-pivotally mounted therewith, having a camming surface 43' which engages one end of lever 44 pivotally mounted at 45, the other end of the lever causing a rectilinear displacement of core 9 in coils 3 and 4 in accordance with the angular movement of the cam member. When the core 9 has been displaced by an amount equal to the displacement of the core 8, the bridge will be rebalanced and galvanometer pointer 13 will return to its mid-position, at which time depression of the bar 18 will cause no movement of the bell crank members or clutch mechanism. The camming surface 43' may be shaped so that the relation of the recording pen 40 with respect to movement of the core 8 will follow any desired law.

The foregoing arrangement provides a recorder having high sensitivity and extreme accuracy, because the slightest condition of unbalance of the bridge circuit is detected by a sensitive instrument, as the galvanometer shown. Since no moving contacts are required in the measuring circuit, the recorder is free from error due to variable contact resistance. The position and movement of the recorder and the core 9 is obtained by relay mechanism powered independently of the measuring circuit, and the system is therefore free from errors caused by friction of parts in the recorder. In the form illustrated, each of the core members 8 and 9 is in a balanced magnetic field except when a condition of unbalance obtains in the bridge circuit, and this increases the sensitivity and accuracy of the system because no magnetic attraction on either core is required to be overcome before effecting movement of the core in response to a change in said quantity or condition.

Fig. 3 illustrates the use of the invention to measure and record the flow of a fluid in a pipe 50. The pipe has a wall with an orifice 51 to provide a pressure differential producing structure. On one side of the orifice is a tube 52 in communication with a manometer 49 comprising a pressure tight tube 53 of non-magnetizable material. Surrounding the tube 53 are the inductance coils 1 and 2, and on the inside of the tube and adapted to reciprocate therewith is the core 8 attached by stem 12 of non-magnetizable material, as brass, to a float member 54, preferably of non-magnetic material. The manometer also comprises a second tube 55 in communication at its lower end with a chamber 69, and having its upper end in communication, by means of tube 56, with the other side of the orifice 51. A sealing fluid 57 of mercury, or other liquid, causes the vertical position of float 54 to vary in accordance with the difference in pressure across the orifice, and as this difference in pressure is proportional to the square of the flow of the fluid in pipe 50, the position of float 54 and core 8 indicates the rate of flow through pipe 50. The inductance coils 1 and 2 are connected in circuit in the manner shown in Fig. 2.

The shaft 28 of the relay mechanism may have a movable insulating drum 62 mounted thereon, and carrying arcuate contact strips 63, 64 adapted, upon rotation of the drum, to be engaged by a relatively fixed contact member 65, the contacts controlling a reversible motor 66, energized from a source of current supply 67. If the rate of flow in the pipe line 50 varies, the relay mechanism will rotate shaft 28 and drum 62 in either direction dependent upon the direction of departure of the rate of flow from a predetermined value, and one of the contact strips will be engaged by contact member 65 to energize the motor 66 in a corresponding direction until the rate of flow returns to said predetermined value. The motor is mechanically connected to control the position of a valve 68 in the pipe line to regulate the flow of fluid therein, so that a given rate of flow may be automatically maintained by the measuring circuit and relay mechanism.

Figure 4:
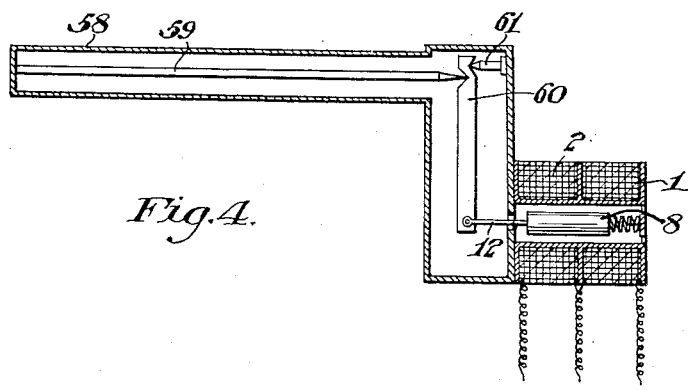

Fig. 4 illustrates the use of the invention to record temperature. In this arrangement a tube 58 of iron, or equivalent, encloses a rod or strip 59 of nickel steel, or equivalent material, having a temperature coefficient of expansion different from that of the tube 58, the rod abutting the tube at one end, and at its other end forming a knife blade for engagement with lever 60 having its one end supported by knife edge 61, with its free end carrying the core 8, the lever being biased, as by a small compression spring, to bear against the knife blade edge of the rod and knife edge 61. The tube and rod are placed in good heat transfer relation to the structure or substance whose temperature is to be determined, and with temperature change the rod changes its length, with respect to the iron tube, the amount of change depending upon the change in temperature of the said structure or substance. This change in the length of the rod causes a corresponding variation in the position of the free end of lever 60, and varies the position of core 8 relative to the inductance coils 1 and 2, the inductance coils being connected to the measuring circuit in the manner of Fig. 2.

In the foregoing, the cores 8 and 9 are referred to as the movable elements, but it will be understood that, in various arrangements, either of them may be stationary, and the inductance coils movable, since it is the relative movement between them that varies the inductance and, hence, the relative impedances of the arms of the bridge circuit. Also, each pair of coils 1 and 2, or 3 and 4, may comprise a single coil, with or without a mid-point tap, and may be employed in various normally balanced circuits, other than the bridge circuit illustrated, for example, the coils may be wound in opposite directions to inductively oppose or neutralize each other, or they may be differentially wound, and so connected that displacement of one of the core members will unbalance the circuit, in various arrangements well-known in the art or suggested by the disclosure herein, without departing from the spirit and scope of my invention.

While the present invention relates only to the mechanical relay apparatus, the measuring system herein disclosed including the inductive bridge circuit is claimed in my continuing application, Serial No. 718,641, filed April 2, 1934.

What I claim is:

1. The combination with a measuring instrument and a moving member deflected thereby, of control mechanism comprising periodically operated means for engaging said moving member and causing displacement of lever structure in a direction and by an amount corresponding to the direction and extent of deflection of said moving member, rotatable structure carrying clutch members adapted to act in opposite directions to engage a clutch wheel, means for causing deflection of said rotatable structure in a direction and by an amount corresponding to the direction and extent of displacement of said lever structure, means for periodically returning said rotatable structure to its normal position, means comprising a fixed member having a cam surface for engaging said clutch members to prevent them from imparting movement to the clutch wheel during deflecting movement of said rotatable structure, and means for causing one of said clutch members to engage said clutch wheel to impart movement thereto during return movement of said rotatable structure.

2. The combination with a measuring instrument and a moving member deflected thereby, of control mechanism comprising periodically operated means for engaging said moving member and causing displacement of lever structure in a direction and by an amount corresponding to the direction and extent of deflection of said moving member, rotatable structure carrying pawls adapted to act in opposite directions to engage a clutch wheel, means for causing deflection of said rotatable structure in a direction and by an amount corresponding to the direction and extent of displacement of said lever structure, means for periodically returning said rotatable structure to its normal position, means comprising a fixed member having a cam surface for engaging said pawls to prevent them from imparting movement to the clutch wheel during deflecting movement of said rotatable structure, and means for causing one of said pawls to engage said clutch wheel to impart movement thereto during return movement of said rotatable structure.

3. The combination with a measuring instrument and a moving member deflected thereby, of control mechanism comprising periodically operated means for engaging said moving member and causing displacement of lever structure in a direction and by an amount corresponding to the direction and extent of deflection of said moving member, rotatable structure carrying pawls adapted to act in opposite directions to engage a clutch wheel, means for causing deflection of said rotatable structure in a direction and by an amount corresponding to the direction and extent of displacement of said lever structure, means comprising rotating studs for periodically engaging and returning said rotatable structure to its normal position, and means comprising a fixed member having a cam surface for engaging said pawls to prevent them from imparting movement to the clutch wheel during deflecting movement of said rotatable structure, and means for causing one of said pawls to engage said clutch wheel to impart movement thereto during return movement of said rotatable structure.

4. Apparatus of the character described comprising a deflecting member movable in opposite directions from a neutral position in response to opposite senses of change of a condition, a driving member normally in a neutral position, a normally stationary driven member, a pair of elements carried by said driving member, structure for holding said elements from engagement with said driven member while said driving member is in neutral position and effecting selective driving engagement thereof with said driven member in accordance with the sense of movement of said driving member from its neutral position, and means for effecting movement of said driving member from neutral position upon movement of said deflecting member from neutral position and in opposite directions for opposite deflections of said member.

5. Apparatus of the character described comprising a deflecting member movable in opposite directions from a neutral position in response to opposite senses of change of a condition, a driving member normally in a neutral position, a normally stationary driven member, a pair of elements carried by said driving member, structure for holding said elements from engagement with said driven member while said driving member is in neutral position and effecting selective driving engagement thereof with said driven member in accordance with the sense of movement of said driving member from its neutral position, power means for intermittently moving said deflecting member normal to its plane of condition-responsive movement, and members on opposite sides of the neutral position of said deflecting member selectively engaged thereby when deflected from neutral and moved by said power means, to transfer power to said driving member for actuation of said driven member in accordance with the sense of deflection of said deflecting member.

6. Apparatus of the character described comprising a deflecting member movable in opposite directions from a neutral position in response to opposite senses of change of a condition, a driving member, a driven member, a pair of elements carried by said driving member, actuating members for moving said driving member in opposite directions disposed on opposite sides of the neutral position of said deflecting member, spring means for normally positioning said driving member in its neutral position and said actuating members adjacent the plane of condition-responsive movement of said deflecting member, structure for holding said elements from engagement with said driven member while said driving member is in its neutral position and effecting selective driving engagement thereof with said driven member for opposite directions of movement of said driving member from neutral, and power means intermittently moving said deflecting member normal to its plane of condition-responsive movement to effect, if said deflecting member is away from neutral position, movement of one or the other of said actuating members thereby to transmit movement to said driven member through one or the other of said elements.

7. Mechanical relay apparatus comprising a deflecting member movable in opposite directions from a neutral position, a driving member normally maintained in a neutral position but movable therefrom in opposite directions in response to opposite deflections of said deflecting member, a normally stationary driven member, a pair of elements carried by one of said driving and driven members for effecting a driving engagement therebetween, and means for selectively restraining said elements from effecting said driving engagement in accordance with the sense of movement of said driving member from neutral position.

8. Mechanical relay apparatus comprising a deflecting member movable in opposite directions from a neutral position, a pivotally mounted driving member normally maintained in a neutral position but angularly movable therefrom in opposite directions in response to opposite deflections of said deflecting member, a normally stationary pivotally mounted driven member, a pair of elements carried by one of said driving and driven members for effecting a driving engagement therebetween, means for selectively restraining said elements from effecting said driving engagement in accordance with the sense of movement of said driving member from neutral position, and means for translating the angular movement of said driven member into rectilinear movement.

9. In combination, a member movable in opposite directions from a neutral position, a driving member normally maintained in a neutral position but movable therefrom in opposite directions in response to opposite movements of said first-mentioned member, a normally stationary driven member, a pair of elements carried by one of said driving and driven members for effecting a driving engagement therebetween, and means for selectively restraining said element from effecting said driving engagement in accordance with the sense of movement of said driving member from neutral position.

WILLIAM MELAS.